E. A. FORD.
FRICTION CLUTCH.
APPLICATION FILED NOV. 15, 1911.
1,076,030.
Patented Oct. 21, 1913.
2 SHEETS—SHEET 1.
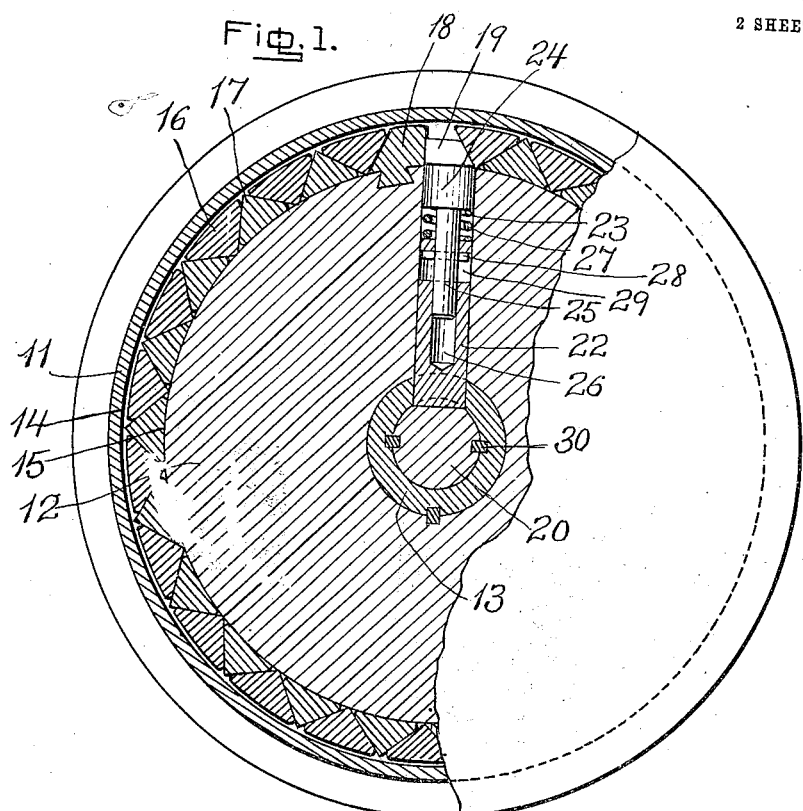
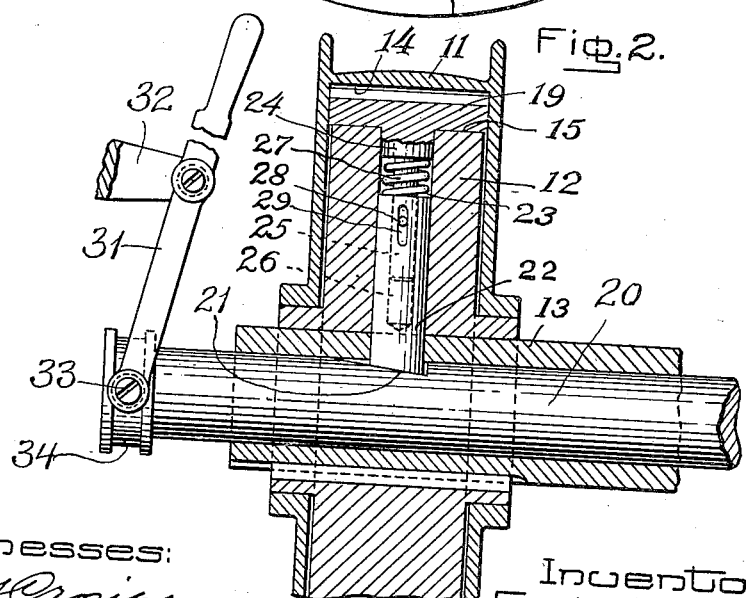
Witnesses:
Inventor,
Eugene A. Ford,

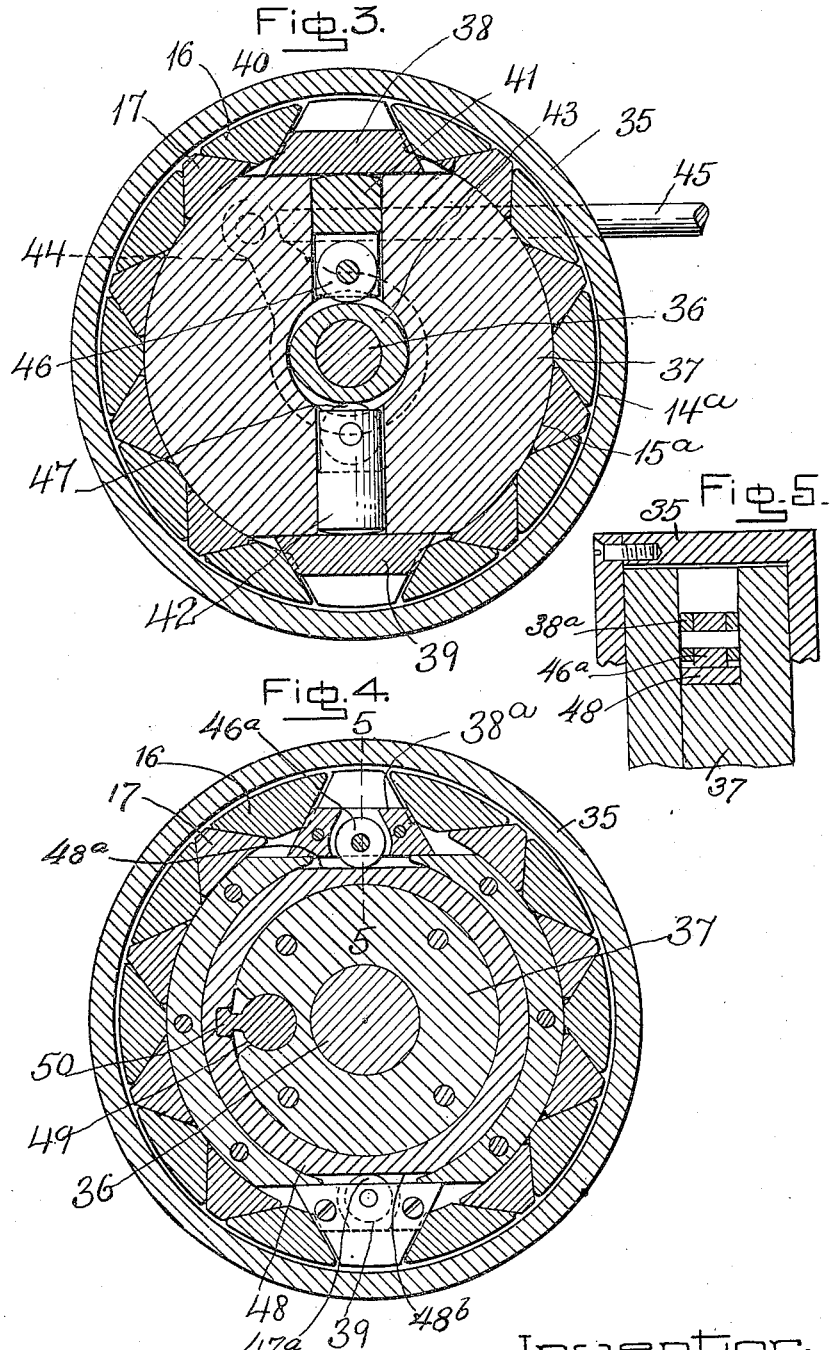

UNITED STATES PATENT OFFICE.

EUGENE A. FORD, OF UXBRIDGE, MASSACHUSETTS.

FRICTION-CLUTCH.

1,076,030. Specification of Letters Patent. Patented Oct. 21, 1913.

Application filed November 15, 1911. Serial No. 660,474.

*To all whom it may concern:*

Be it known that I, EUGENE A. FORD, of Uxbridge, in the county of Worcester and State of Massachusetts, have invented certain new and useful Improvements in Friction-Clutches, of which the following is a specification.

The object of the present invention is to provide an improved friction clutch having the double advantages of being able to secure an exceptionally tight and firm grip, and of being simple in construction and inexpensive to build.

The clutch is adapted to serve for any of the purposes for which friction clutches may be put, and may in addition be employed as a friction brake.

In the accompanying drawings I have illustrated three possible embodiments of my invention, such embodiments all including the same fundamental features of improvement.

In the drawings, Figure 1 represents a side elevation partly broken away of a clutch made in accordance with one form of the invention. Fig. 2 is a cross-section of the same on a plane passing through the axis of the clutch, showing also a device for operating the clutch. Fig. 3 is a cross-section of a modified form of the clutch. Fig. 4 is a view similar to Fig. 3, showing still another form of the clutch. Fig. 5 is a section on line 5—5 of Fig. 4.

Referring first to Figs. 1 and 2, I have indicated at 11 and 12 two members constituting the main elements or members of the clutch. One of these members as 12 is secured to a shaft 13, and the other is adapted to rotate freely about the shaft and the member 12, except when clutched to the latter. These members are preferably cylindrical and have complemental faces 14 and 15 respectively, which are concentric and are separated from one another by a space of uniform width at all points. Conveniently the member 11 may be the rim of a pulley or wheel, and the member 12 a disk contained within said pulley or wheel, as shown in Fig. 2. In the annular space between the members 11 and 12 are a series of prismatic members or wedges 16, 17, of which the alternate members 16 have outer faces adapted to bear over an extended area against the surface 14 of the member 11, and the intermediate wedge members 17 have faces adapted to bear similarly on the face 15 of the member 12. The intermediate faces of the alternating wedges 16 and 17 are inclined, and make contact with each other. The wedge at one end of the series abuts against a block 18 secured to the disk 12 in any suitable manner, and the wedge at the other end of the series bears against an actuator 19 arranged close beside the block 18, and adapted to move toward and from the surface 14. Inside the shaft 13, which is made tubular throughout a sufficient portion of its length for this purpose, is an endwise movable rod or cam member 20 having an inclined cam surface 21 arranged to bear against a block 22, which is adapted to slide in a channel 23 in the disk 12. The actuator 19 is formed upon or as a part of a plunger 24 having a stem 25 which enters a recess 26 in the sliding block 22, and is pressed outward from said block by a spring 27 to the extent permitted by a pin 28 carried by the stem 25 and projecting into slots 29 in the sliding block 22. The cam rod 20 is prevented from rotating relatively to the shaft and is thereby retained with its cam surface 21 turned toward the sliding block 22, by feathers 30. A lever 31 pivoted to a bracket 32 has a forked arm provided with studs 33 which enter a groove 34 in a head or collar on the rod 20, and serves as a means for moving the rod endwise.

It will be seen that when the rod 20 is moved to the right, as represented in Fig. 2, the cam surface 31 forces the composite plunger consisting of the sliding blocks 22 and 24 and the spring 27, carrying the actuator 19, outwardly, whereby the actuator is crowded between the abutment 18 and the endmost wedge of the series. The actuator is preferably beveled on the side which engages the wedge. Accordingly in being moved outwardly it forces the wedge to one side, transmitting force through the latter to all of the wedges in the series, crowding the wedges together and causing them to press against the surfaces 14 and 15. The wedges designated 16 are crowded outwardly against the surface 14 and those designated 17 are crowded inwardly against the surface 15. A relatively small force applied to the actuator is thus enabled to bring heavy frictional clutching pressure to bear over practically the entire extent of the complemental surfaces of the clutch members. When the clutch rod is returned to the position shown in Fig. 2, the pressure applied by the actuator is relieved and the wedges are allowed to relax and to lie loosely between the members of the clutch.

It is possible to make the plunger which carries the actuator as a single rigid bar, but I prefer to make it yielding, as illustrated, in order to permit the full throw of the cam rod 20 to be given in any condition, without exerting excessive pressure upon the wedges.

The foregoing embodiment of the invention is particularly applicable for connecting loose pulleys or wheels with shafting, and disconnecting them from the shafting. In Figs. 3, 4 and 5 I have shown two embodiments of the invention adapted not only for the same use, but also to serve as brakes for vehicle wheels such as the driving wheels of automobiles and the like. In the embodiment shown in Fig. 3, it may be assumed that 35 is the hub of a wheel and 36 a driving shaft or axle secured to the wheel at a point outside of the plane of the drawings. 37 represents a stationary disk or brake drum fixed to a part of the vehicle structure. The hub 35 and drum 37 have complemental surfaces 14$^a$ and 15$^a$ arranged as shown in Fig. 1, with an annular space between them containing alternating wedges 16 and 17. These wedges have the same relation as previously described, except that they form two series and that I provide two actuators at opposite sides of the clutch. These actuators consist of radially moving wedges 38 and 39 contained in recesses between guides 40 projecting from the drum 37 between the two sets of wedges. These actuators are beveled on the sides which engage the wedges and are moved outwardly by plungers 41 and 42 contained in guideways in the drum and engaged with a cam 43 rotatably mounted on the shaft 26 and having protuberances on opposite sides. Connected to the cam outside of the clutch is an actuated arm 44 to which is connected an operating rod or link 45. Anti-friction rolls 46, 47 are carried by the plungers 41, 42 and bear upon the cam 43. It will be evident that when the cam is rotated through a quarter turn the actuators 38 and 39 are forced outwardly and the wedges crowded in engagement with the members 35 and 37, thereby resisting tendency of the member 35 to rotate.

In Figs. 4 and 5 a modification of the same idea is shown. In this embodiment the actuator wedges 38$^a$, 39$^a$ carry anti-friction rolls 46$^a$, 47$^a$, respectively, which are acted upon directly by a cam 48 which is a ring set into an annular recess or groove in the face of the drum 37. This ring is flattened at opposite sides to form the cam surfaces 48$^a$, 48$^b$. The means for operating the cam consists of a rock shaft 49 set into the drum 37 parallel to and outside of the shaft 36, and carrying a short rock arm 50 which enters a recess in the cam ring. Any means similar to the arm 44 and link 45, or other means, may be used for rocking the shaft 49.

It is not an essential of my invention that the complemental surfaces of the main clutch member should be cylindrical in form, for it is possible to make them plane and to dispose them otherwise than one within the other without departing from the spirit of the invention. I declare that any combination of elements is within the scope of my invention provided it includes two main members, either or both of which may rotate, and provided with complemental separated surfaces, between which are contained wedges, arranged parallel with the axis of rotation of said member or members, and having suitable means for crowding such wedges together and into contact with the main members.

I claim—

1. A friction clutch comprising members, either or both of which is capable of rotating, said members having complemental surfaces spaced apart, wedges parallel with the axis of rotation contained between such surfaces and adapted to be crowded together and to be thereby forced oppositely into engagement with said surfaces, and means for so moving the wedges.

2. A friction clutch comprising members having separated co-axial surfaces, a series of wedging members arranged parallel to the axis of said clutch members interposed loosely between said surfaces, and means for crowding said wedging members against one another and thereby against said surfaces.

3. A friction clutch comprising two members, one of which may rotate, each having a surface co-axial with, and separated equally at all points from, a complemental surface on the other member, a series of wedges interposed between said members arranged parallel with the axis of said members and having faces adapted to bear on the faces of said members respectively, and having flanking inclined faces in contact with each other, and means for forcing said wedges together, whereby alternate wedges are crowded in opposite directions against the said members.

4. A clutch, comprising two members, of which one or both may rotate, having complemental surfaces, flanking an intermediate space, a series of wedges nested together loosely in such space arranged parallel with the axis of said members with their inclined sides in contact with one another and their base portions directed alternately toward one and the other of the complemental surfaces, and an actuator movable across the said space and arranged to bear on the inclined side of one of the wedges.

5. A clutch comprising a drum or disk, and a sleeve surrounding the same, said drum and sleeve having opposed co-axial cylindrical surfaces, inclosing an annular space, a circular series of wedges loosely occupying such annular space, arranged parallel with the axis of said drum and sleeve, and an actuator movable across such space between two of the wedges.

6. A clutch comprising a drum or disk, and a sleeve surrounding the same, said drum and sleeve having opposed co-axial cylindrical surfaces, inclosing an annular space, a circular series of wedges loosely occupying such annular space, and arranged parallel with the axis of said surfaces, and means for forcing alternate wedges respectively outwardly and inwardly into close frictional engagement with the respective cylindrical surfaces, to couple the clutch members together.

In testimony whereof I have affixed my signature, in presence of two witnesses.

EUGENE A. FORD.

Witnesses:
FORREST R. ROULSTONE,
ARTHUR H. BROWN.

Copies of this patent may be obtained for five cents each, by addressing the "Commissioner of Patents, Washington, D. C."